United States Patent [19]

Spanier

[11] 4,192,616

[45] Mar. 11, 1980

[54] INJECTION UNIT FOR INJECTION MOLDING APPARATUS

[75] Inventor: Hermann Spanier, Windhagen, Fed. Rep. of Germany

[73] Assignee: Dr. Boy KG, Fernthal, Fed. Rep. of Germany

[21] Appl. No.: 901,094

[22] Filed: Apr. 28, 1978

[30] Foreign Application Priority Data

Apr. 28, 1977 [DE] Fed. Rep. of Germany ....... 2719067

[51] Int. Cl.² ............................................... B29F 1/04
[52] U.S. Cl. ...................................... 366/79; 366/318; 403/355; 403/317
[58] Field of Search ..................... 366/79, 92, 318; 403/355, 378, 379, 317, 316; 285/81

[56] References Cited

U.S. PATENT DOCUMENTS

| 3,401,951 | 9/1968 | Bloom | 403/379 X |
| 3,806,294 | 4/1974 | Hehl | 366/79 |

FOREIGN PATENT DOCUMENTS 1333037  6/1963  France ...................... 403/316

*Primary Examiner*—Billy S. Taylor
*Attorney, Agent, or Firm*—Thomas E. Beall, Jr.

[57] ABSTRACT

A detachable coupling provided between the helix and drive shaft of an injection molding machine is provided by a flattened end of the helix shaft received within a fork-shaped end of the actuation shaft so that respective boreholes are aligned for receiving therethrough a pin. An axially slidable locking sleeve is movable between a position preventing movement of the pin and a position permitting removal of the pin, and a resiliently urged locking detent ball and groove are provided at each of the positions.

7 Claims, 6 Drawing Figures

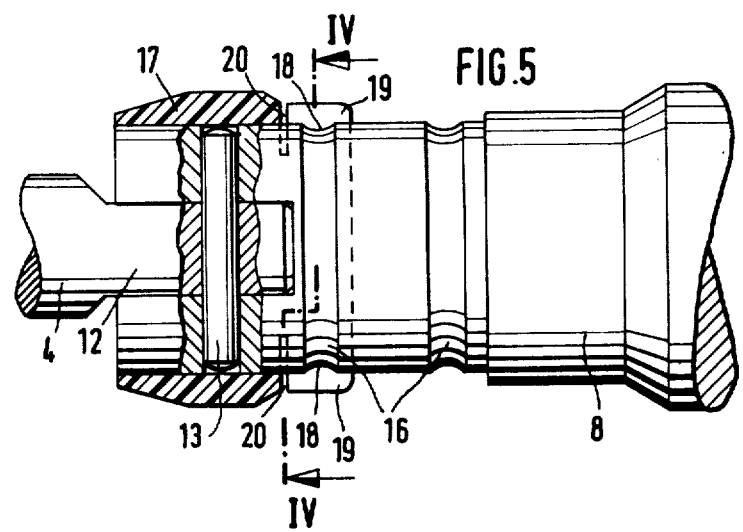
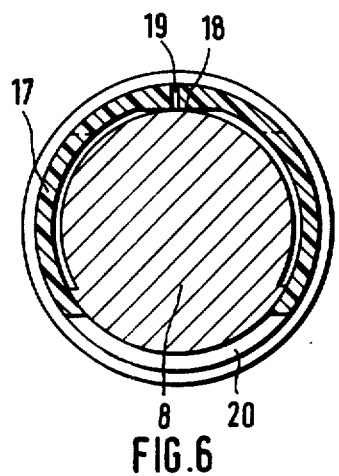
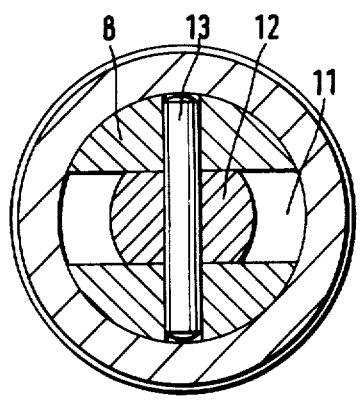

INJECTION UNIT FOR INJECTION MOLDING APPARATUS

The invention relates to an injection unit for an injection molding apparatus, comprising a plasticizing cylinder which is detachably mounted on a guide casing, and a helix mounted for axial and rotational movement inside the plasticizing cylinder, the helix being connected to an axially and rotationally reciprocable actuation shaft.

In injection units of the type which work with preplastification, the material is impounded from the circulating helix in front of the nozzle and put under pressure while the helix subsequently moves backwards. It has also been found that it is especially advantageous to release the material after ending of the dosaging process; that is, retract the helix before the beginning of the injection thrust. Thus, the connection between the helix and the actuation must be capable of withstanding the tensile force resulting from retraction of the actuation shaft.

The invention is directed to an advantageous construction for forming the rigid connection between the actuation shaft and the helix such that fast and easy assembly and disassembly is possible. In this way the removal and replacement of the plasticizing cylinder containing the helix is simplified.

The injection unit according to the invention is characterized in that the actuation shaft has a fork-shaped end forming a slit in the end face of the shaft and that the helix is provided with a flattened end for mating with the slit. A pin is insertable into radially co-aligning boreholes in the fork-shaped end of the actuation shaft and the flattened end of said helix and is securable by means of a slidable locking ring provided on the actuation shaft.

To assemble the plasticizing cylinder, it is fastened on the guide casing and the flattened end of the helix is moved into the slit in the end face of the actuation shaft. With that the helix and shaft are rigidly locked together for rotation. Then the pin is inserted in the now aligning boreholes to provide axial locking of the helix and actuation shaft. Finally, the sliding ring is moved over the pin to prevent the latter from being slung out. Disassembly of the coupling is carried out in the reverse sequence, although it may be sufficient to remove the pin only partially, so that it stays in one of the fork arms of the actuation shaft. Altogether, the operation of the coupling is simple so that the plasticizing cylinder can be assembled and disassembled easily. A further advantageous feature consists in that the slidable locking ring carries at least one member projecting resiliently inwardly of said ring, and that the actuation shaft is provided on its outer surface with circumferential grooves for receiving the inwardly projecting member in order to define the respective securing and/or releasing positions of the slidable locking ring. This also simplifies the operation of the device because the slidable locking ring can be moved between respective defined detent positions. The slidable locking ring is further secured against unintentionally sliding out of its securing position.

The member projecting resiliently inwardly of said ring preferably comprises at least one spring loaded bell detent.

In an alternate form of the invention which is favorable from the production standpoint, the slidable locking ring is constructed of a resilient material and the member projecting resiliently inwardly of the ring comprises at least one-piece resilient cam.

It is especially advantageous for space-saving reasons to have the cam lie at the end of a resilient arm which extends circumferentially in a recess about the interior of the ring.

Optimal construction and assembly are obtainable with a construction in which at least one pair of such resilient arms are provided, the arms being defined by a recess running parallel to an end face of the ring and by a rectangular separation recess opening to such end face of the ring.

The invention is shown in detailed examples in the drawings, in which:

FIG. 3 shows a cross-sectional view of the coupling taken along line III—III of FIG. 2;

FIG. 5 shows a modified version of the coupling of FIG. 3 in a partial cut-away view; and FIG. 6 shows a cross-sectional view taken along line IV—IV of FIG. 5.

Figure 1:
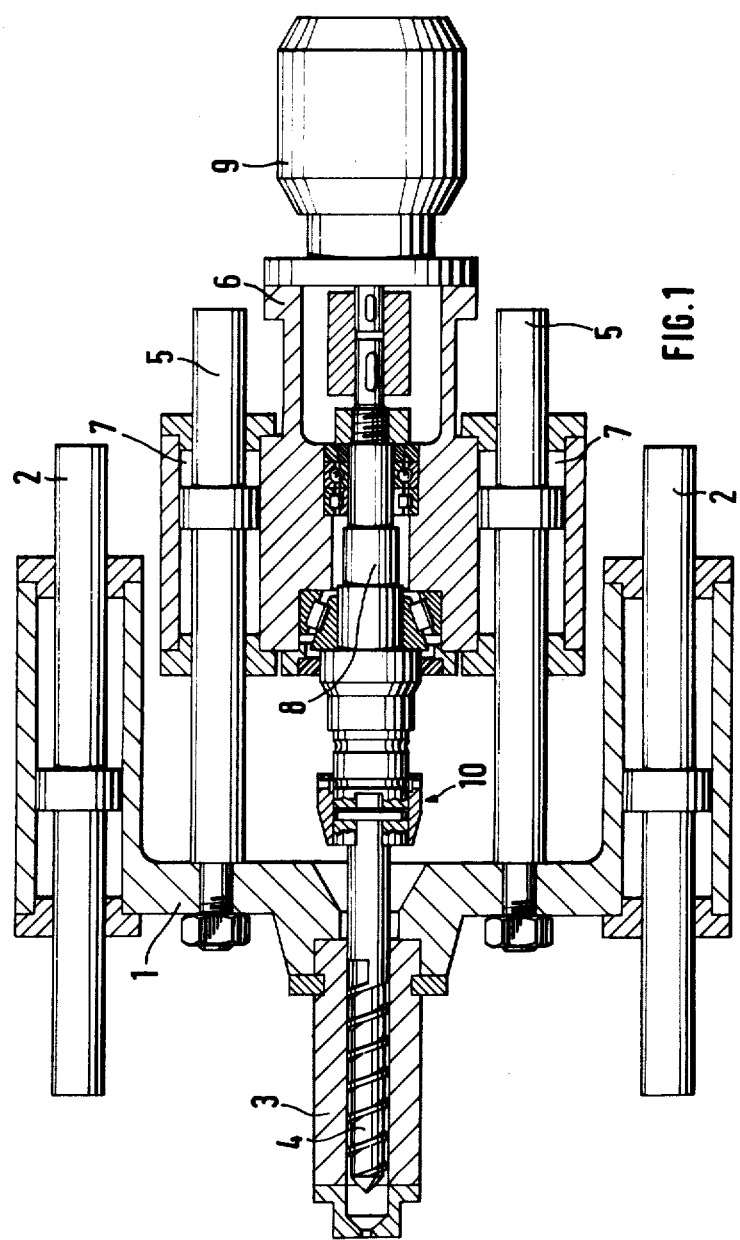
FIG. 1 shows a cut-away plan view of the injection unit.

As shown in FIG 1, the injection unit comprises essentially a guide casing 1, which is slidably mounted on stationary posts 2, and is movable by pistons. The guide casing 1 carries on its front side a removable plasticizing cylinder 3 having a helix 4 mounted therein. The guide casing carries on its rear side posts 5, on which a carrier 6 is arranged. The carrier defines cylinders 7 which, together with the pistons on the post 5, form the actual injection cylinder. An actuation shaft 8 is arranged in the carrier 6. Actuation shaft 8 can be brought into rotation by a rotary driver 9. Between the helix 4 and the actuation shaft 8 a coupling 10 is arranged so as to transfer not only the rotating moment and the pressure forces during injection, but also the axial forces during releasing of the pre-plasticized material.

Figure 2:
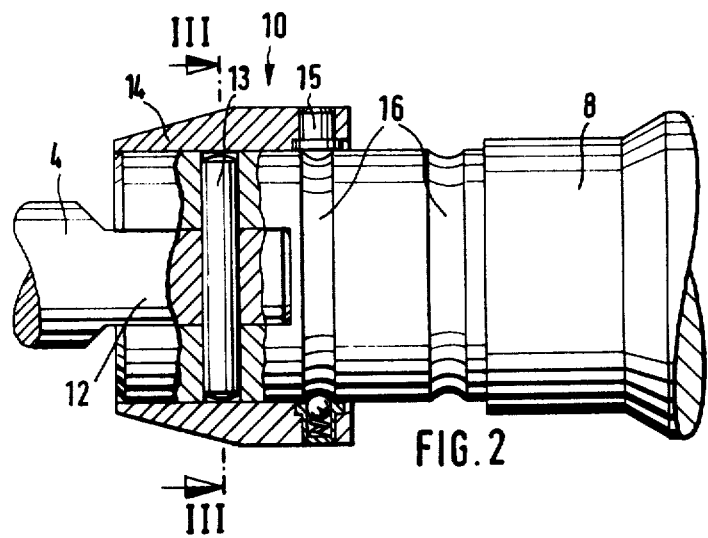
FIG. 2 shows the coupling in locked position, in a partial cut-away view.

FIGS. 2 and 3 show the coupling in locked condition. The actuation shaft 8 has a slit 11 in its end face so that a fork-shaped end results. A flattened end 12 of the helix 4 mates with the slit 11. A pin 13 goes through co-aligning boreholes in the fork-shaped end of the actuation shaft and in the flattened end of the helix.

A slidable locking ring 14 serves to secure pin 13 in the assembled position by covering the pin ends. Arranged on the inside of the slidable locking ring are two co-aligning ball detents 15 which correspond to circumferential grooves 16 in the outer surface of the actuation shaft 8. In locked position, the ball detents engage the front circumferential groove.

Figure 4:
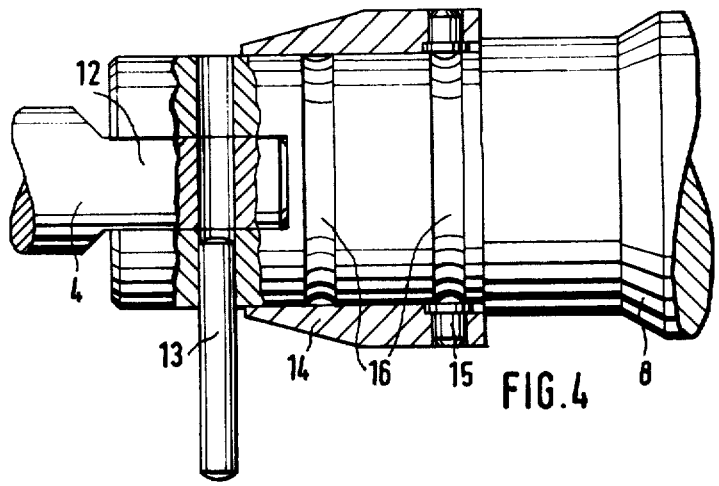
FIG. 4 shows the coupling in opened position, in partial cut-away.

To loosen the coupling, the slidable locking ring 14 is moved into the position shown in FIG. 4 in which the ball detents 15 engage the rear circumferential groove 16. The pin 13 can then be pushed into the one forked end part of the actuation shaft 8, also as shown in FIG. 4.

In the modification according to FIGS. 5 and 6, the slidable locking ring 17 is formed of resilient material. On its rear end face are arranged resilient cams 18 for engaging circumferential grooves 16. The cams are preferably arranged in pairs as shown, and are formed on the leading ends of respective opposing arms which extend around the circumference of the ring. Between each cam pair runs a separation recess 19 which opens into a recess 20. Recess 20 runs parallel to the rear end face of the ring, i.e. also in circumferential direction.

The arrangement can also be made, without any difficulty, such that the resilient cam-carrying arms lie in spaced relation to one of the end faces of the resilient ring, such that for each cam pair two parallel recesses 20 are present which are connected with each other over a common separation recess.

The construction according to the invention makes it possible to turn the slidable locking ring into any desired position without affecting the security of functioning. Therefore, it is not necessary to hold the slidable locking ring rigidly against rotation on the actuating shaft.

I claim:

1. In an injection unit for an injection molding apparatus, having a guide casing, a plasticizing cylinder detachably mounted on said guide casing, a helix mounted for axial and rotational movement within said plasticizing cylinder, and an axially and rotationally reciprocable shaft for actuating said helix, the improvement for detachably coupling said helix to said actuation shaft wherein said actuation shaft has a fork-shaped end forming a slit in the end face of said shaft, said helix is provided with a flattened end for mating with said fork-shaped end of said actuation shaft, said fork-shaped end and said flattened end are provided with respective radially extending boreholes which are co-aligned when said flattened end and fork-shaped end are mated, further including a pin extending through said aligned boreholes and a ring mounted slidably on said actuation shaft for securing said pin in position in said boreholes, said ring being mounted on said actuation shaft for movement between a locking position completely encircling said boreholes and pin to prevent retraction of said pin from said boreholes and an uncoupling position completely axially spaced from said boreholes permitting removal of said pin from said boreholes, and releasable means for securing said locking ring in said locking position.

2. The injection unit of claim 1, wherein said locking ring carries at least one member projecting resiliently inwardly of said ring, and said actuation shaft is provided on its outer surface with circumferential grooves for receiving said member and thereby securing said ring in position relative to said boreholes on said actuation shaft.

3. The injection unit of claim 2, wherein said resilient member projecting resiliently inwardly of said ring comprises a spring-loaded ball detent.

4. The injection unit of claim 2, wherein said ring is constructed of a resilient material and said at least one member projecting resiliently inwardly of said ring comprises at least one one-piece resilient cam.

5. The injection unit of claim 4, wherein each said cam lies at the end of a resilient arm, said resilient arm extending circumferentially in a recess about the interior of said ring.

6. The injection unit of claim 5, wherein at least one opposing pair of said resilient arms is provided, and said arms are defined by a recess running parallel to an end face of said ring and by a rectangular separation recess opening to said end face of said ring.

7. The injection of claim 1, wherein said means for securing includes a resiliently biased detent on one of said locking ring and said actuating shaft, and an aperture on the other arranged so that said detent engages within said aperture in the locking position of said locking ring.

* * * * *